United States Patent [19]
Bentone et al.

[11] 3,745,815
[45] July 17, 1973

[54] DEVICE FOR EVALUATING THE VIBRATIONS OF A REVOLVING MEMBER

[75] Inventors: Pier Felice Bentone; Pier Giorgio Golzio; Vincenzo Vrola, all of Turin, Italy

[73] Assignee: RIV-SKF Officine di Villar Perosa S.p.A., Turin, Italy

[22] Filed: Oct. 5, 1971

[21] Appl. No.: 186,287

[30] Foreign Application Priority Data
Oct. 17, 1970  Italy.............................. 70460 A/70

[52] U.S. Cl...................................... 73/71.4, 73/69
[51] Int. Cl................................................. G01h 1/08
[58] Field of Search...................... 73/71.4, 71.2, 67, 73/67.2, 69

[56] References Cited
UNITED STATES PATENTS
3,002,376  10/1961  Crampton et al..................... 73/71.4
2,789,269  4/1957  De Bolsblanc...................... 73/35 X

*Primary Examiner*—James J. Gill
*Attorney*—Irvin S. Thompson

[57] ABSTRACT

A device for evaluating the vibrations of a revolving member comprises a detecting head for detecting the vibrations and their amplitude, an integrating circuit actuated by a monostable multivibrator that generates a pulse in correspondence with each detected vibrations, and an amplitude discriminating circuit whose threshold value is such as to emit a signal only when a signal received thereby from the integrating circuit has an amplitude corresponding to the sum of a plurality of those pulses.

4 Claims, 1 Drawing Figure

PATENTED JUL 17 1973  3,745,815
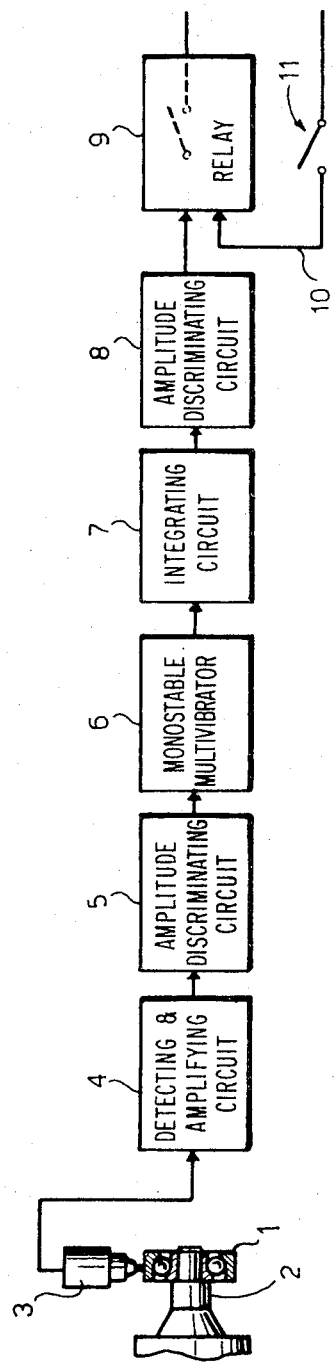

DEVICE FOR EVALUATING THE VIBRATIONS OF A REVOLVING MEMBER

This invention relates to a device for evaluating the vibrations of a revolving member, for instance of a rolling bearing, which is adapted to deliver, when said vibrations exceed a predetermined value, a signal for actuating a display device or other device.

For evaluating the vibrations of a revolving member, for instance a rolling bearing, use is made, as is well known, of various kinds of transducers adapted to generate an electric signal as a function of the vibration produced by the member being tested.

In an apparatus of a first kind, appropriate electric circuits suitably analyze these signals by measuring the average or mean value of a certain frequency band. This mean value is utilized to indicate the vibration level on appropriate direct-reading display devices.

However, the apparatus of the kind mentioned above suffers from the drawback that particular vibrations are not detected or indicated thereby. In fact, such apparatus is normally able to detect vibrations of very short duration, even though of high amplitude, that is to say of small mean value. This depends on the inertia, by no means negligible, of certain components utilized in said apparatus.

In an apparatus of a second kind, the signals generated by the aforementioned transducers, after being amplified, are delivered to an oscilloscope or, more frequently, to a loudspeaker, so as to obtain, in the first instance, a visual display of the behavior of the vibration and, in the second instance, an acoustical indication of said vibration. Even though it is possible to detect with such apparatus, as contrasted with the apparatus of the first-mentioned kind, vibrations of very short duration and of high amplitude, it suffers however from the drawback that a subjective evaluation is required from the operator, in order to establish when the signal reaches a dangerous level and, in general, continuous attention by an operator is required, which does not permit utilizing such apparatus for very long periods of time, for instance during testing.

According to the present invention there is provided a device for evaluating the vibrations of a revolving member, for instance of a rolling bearing, which avoids the disadvantages enumerated above.

The device in accordance with the invention, which comprises a pick-up unit adapted to detect the vibrations of a revolving member, is characterized in that means are provided for generating a signal upon reaching a predetermined number of vibrations, each of which has an amplitude greater than a predetermined value.

For a better understanding of the present invention one embodiment thereof will now be described, with reference to the accompanying drawing which is a block diagram of the electronic circuit of the device of the invention.

The revolving member which, in the case of the embodiment illustrated comprises a ball bearing 1, is mounted on a rotating spindle 2. A suitable pick-up unit or detecting head 3 is in contact with the outer side surface of the bearing.

The detecting head 3 comprises an electrodynamic detector, for instance an accelerometer which is connected with a detecting and amplifying circuit 4, which also comprises appropriate filters for eliminating undesired components of the signals generated by detector 3 and whose frequency normally is less than a predetermined value. The circuit 4 is followed by a trigger or amplitude discriminating circuit 5, connected with a monostable multivibrator 6, followed by an integrating circuit 7 and, finally, a second amplitude discriminating circuit 8.

The circuit 8 is connected to a relay 9, which closes, when energized, a circuit (not shown) of a display unit or of a servo-mechanism of suitable kind. A conductor or lead 10, provided with a switch 11, delivers resetting pulses to the relay 9, in order to return the latter in its original condition, i.e., in its condition prior to its energization.

The operation of the device described above is as follows:

Upon rotation of the spindle 2, vibrations are transmitted to the outer ring or race of the bearing 1, which are detected by the accelerometer of the detecting head 3. The signals generated by said head 3 are delivered to the detecting and amplifying circuit 4, where they are amplified and filtered by means of the filters in said circuit. These filters, as already stated, eliminate undesired components of the signals, which are due, for instance, to mechanical vibrations generated by eccentric masses of some part of the device for supporting the spindle 2. It has been found that, at the output of the circuit 4, signals are obtained which are usable subsequently if the filters of circuit 4 permit passage solely of signals whose frequency is in excess of 100 Hertz.

The output signals from the circuit 4, which correspond to the vibrations of the bearing to be tested, are substantially pulse signals of high amplitude but normally of very short duration and, therefore, of negligible average or mean value.

These signals are applied to the trigger or amplitude discriminating circuit 5, whose threshold level can be set at a desired value, so as to pass signals having only at least a predetermined amplitude. The threshold level of circuit 5 is chosen so that this circuit will pass only signals corresponding to vibrations whose magnitude is considered excessive.

The output signals from the circuit 5 are delivered to the monostable multivibrator 6 which for each signal will generate a pulse that is fed to the integrating circuit 7 whose output signal, which is equal to the sum of the various pulses which reach it, is delivered to the amplitude discriminating circuit 8. The threshold value of said discriminating circuit is such that it will be activated only when the amplitude of the input signal corresponds to the sum of a predetermined number of pulses delivered to the integrating circuit 7.

The assembly comprising the circuits 6, 7 and 8 provides, therefore, a system which prevents the passage of spurious signals, corresponding to isolated pulses which can be produced during the rotation of the bearing, but which do not give rise to vibrations that can be dangerous to the bearing. In the case when the device is to be used for evaluating the noise produced by the bearing, said isolated pulses will correspond to cracklings which do not exert any noticeable influence on the noise of said bearing. In fact, a few isolated signals leaving the discriminating circuit 5, would be able to cause few pulses to be generated by the monostable multivibrator 6, which pulses would give rise, at the output of the integrator 7, to a signal whose level would be insufficient to activate the amplitude discriminating circuit 8. Therefore, such isolated signals would not give rise to any output signal from the discriminating circuit 8.

It has been found suitable to establish a threshold value of the circuit 8 corresponding to an amplitude equal to the sum of about 10 pulses added by the integrating circuit 7.

The output signal from the circuit 8, generated in the manner described above, is delivered to the relay 9, thereby energizing the same and causing the completion of the electric circuit controlled by said relay.

In this circuit, as already stated, any indicator device can be provided, for instance of the acoustic type, which will give an indication whenever the vibration of the bearing being tested exceeds a predetermined value.

In the circuit of relay 9 any other servo-mechanism can be connected, for instance a device adapted to actuate means for automatically rejecting any bearing whose noise is excessive.

The relay 9 can be brought back to its original condition prior to its energization, by actuating the switch 11, so as to deliver to relay 9 a resetting pulse through the lead 10.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. A device for evaluating the vibrations of a revolving member, comprising detecting means detecting the vibrations of said revolving member, means generating electrical pulses of different amplitude that varies with the magnitude of the vibrations, means for receiving said pulses of different amplitude and for emitting pulses of equal amplitude whenever pulses of amplitude greater than a predetermined minimum amplitude are received, and means for receiving said pulses of equal amplitude and for generating a signal when the number of said pulses of equal amplitude exceeds a predetermined number per unit time.

2. A device for evaluating the vibrations of a revolving member, comprising detecting means detecting the vibrations of said revolving member and emitting signals that vary as said vibrations, an amplifying circuit and at least one filter to eliminate the components of said signals which are not produced by vibrations of the revolving member, a first amplitude discriminating circuit receiving signals from said amplifying circuit and filter, said amplitude discriminating circuit having a threshold level that permits the exit therefrom solely of signals corresponding to vibrations of at least a predetermined minimum amplitude, a monostable multivibrator that receives the last-named signals and which generates a pulse in correspondence with each said received signal, an integrating circuit actuated by said monostable multi-vibrator, and a second amplitude discriminating circuit having a threshold value such as to emit a signal only when the signals delivered thereto by the integrating circuit exceed a predetermined number per unit time.

3. A device as claimed in claim 2, and a relay control circuit adapted to be energized by signals from said second amplitude discriminating circuit.

4. A device as claimed in claim 2, and means for feeding the signal at the output of said second amplitude discriminating circuit to an indicating device.

* * * * *